(12) United States Patent
Chen et al.

(10) Patent No.: US 11,761,912 B2
(45) Date of Patent: Sep. 19, 2023

(54) X-RAY SECURITY DEVICE

(71) Applicant: Delta Electronics, Inc., Taoyuan (TW)

(72) Inventors: Sih-Yu Chen, Taoyuan (TW);
Jhih-Shian Lee, Taoyuan (TW);
Yuan-Lo Huang, Taoyuan (TW);
Jui-Ting Hsu, Taoyuan (TW);
Chih-Pin Chiu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 20 days.

(21) Appl. No.: 17/670,936

(22) Filed: Feb. 14, 2022

(65) Prior Publication Data
US 2023/0258583 A1     Aug. 17, 2023

(51) Int. Cl.
*G01N 23/083* (2018.01)
*G01N 23/10* (2018.01)

(52) U.S. Cl.
CPC ........... *G01N 23/10* (2013.01); *G01N 23/083* (2013.01); *G01N 2223/3307* (2013.01)

(58) Field of Classification Search
CPC ............... G01N 23/10; G01N 23/083; G01N 2223/3307
See application file for complete search history.

(56) References Cited

U.S. PATENT DOCUMENTS

| | | | |
|---|---|---|---|
| 6,304,629 B1 | 10/2001 | Conway et al. | |
| 9,953,732 B2 * | 4/2018 | Thomas | G21F 3/00 |
| 10,739,282 B2 * | 8/2020 | Chen | G01V 5/0008 |
| 2017/0032858 A1 | 2/2017 | King | |
| 2018/0299580 A1 | 10/2018 | Morton | |

FOREIGN PATENT DOCUMENTS

| | | |
|---|---|---|
| CN | 106165023 A | 11/2016 |
| CN | 110662488 A | 1/2020 |
| JP | 2012145397 A | 8/2012 |

OTHER PUBLICATIONS

Office Action dated Nov. 22, 2022 of the corresponding Japan patent application No. 2022-020247.
Office Action dated Aug. 18, 2022 of the corresponding Taiwan patent application No. 111105259.

* cited by examiner

*Primary Examiner* — Jurie Yun
(74) *Attorney, Agent, or Firm* — Chun-Ming Shih; HDLS IPR SERVICES

(57) ABSTRACT

This disclosure is directed to an X-ray security device having a main body, a conveyor, and a lead curtain. The main body has an opening. The conveyor passes through the opening and is disposed on a bottom of the opening. The lead curtain is hung on the main body and covers the opening, the lead curtain has a pair of outer modules and a central module, the pair of outer modules are arranged corresponding to two sides of a transport direction of the conveyor, and the central module is disposed between the outer modules. A lead equivalent thickness of each outer module is larger than a lead equivalent thickness of the central module, and a weight of the central module is less than a weight of each outer module.

15 Claims, 6 Drawing Sheets

X-RAY SECURITY DEVICE

BACKGROUND OF THE DISCLOSURE

Technical Field

This disclosure is directed to an inspection device, and in particular, to an X-ray security device used for object inspection.

Description of Related Art

A related-art X-ray security inspection equipment uses lead curtains arranged at inlet and outlet openings thereof with uniform lead equivalent thickness to shield the radiation in the machine. Generally, a lead curtain with high lead equivalent can shield the radiation more effectively, but the lead curtain is heavier and generates a greater resistance to the transferred objects. Therefore, when objects are transferred through the opening, smaller objects may not move smoothly into the machine through the lead curtain. Moreover, a higher cost is required. However, a thin lead curtain may leak high radiation dose to the operators at two side of the opening of object passage, and the radiation cannot be effectively shielded.

In view of the above drawbacks, the inventor proposes this disclosure based on his expert knowledge and elaborate researches in order to solve the problems of related art.

SUMMARY OF THE DISCLOSURE

This disclosure is directed to an X-ray security device used for object safety inspection.

This disclosure is directed to an X-ray security device having a main body, a conveyor, and a lead curtain. The main body has an opening. The conveyor passes through the opening and is disposed on a bottom of the opening. The lead curtain is hung on the main body and covers the opening, the lead curtain has a pair of outer modules and a central module, the pair of outer modules are arranged corresponding to two sides of a transport direction of the conveyor, and the central module is disposed between the outer modules. A lead equivalent thickness of each outer module is larger than a lead equivalent thickness of the central module, and a weight of the central module is less than a weight of each outer module.

According to the X-ray security device of this disclosure, a thickness of each outer module is larger than a thickness of the central module. Each outer module has a plurality of outer curtain strips, the central module has a plurality of central curtain strip, a thickness of the outer curtain strip is between about 3.0 mm to about 3.5 mm, and a thickness of the central curtain strip is between about 2.0 mm and about 2.5 mm.

According to the X-ray security device of this disclosure, each outer module has a plurality of outer curtain strips, the central module has a plurality of central curtain strips. A lead equivalent thicknesses of each outer curtain strip is double of a lead equivalent thicknesses of the central curtain strip. The lead equivalent thickness of each outer curtain strip is about 1.0 mm Pb, and the lead equivalent thickness of each central curtain strip is about 0.5 mm Pb.

According to the X-ray security device of this disclosure, each outer module has a plurality of outer curtain strips, the outer curtain strips are stacked in two layers and arranged staggeredly. The central module has a plurality of central curtain strips, the central curtain strips are stacked in two layers and arranged staggeredly. The outer curtain strips and the central curtain strips disposed at junctions between the central module and each outer module are overlapped with each other and arranged staggeredly.

According to the X-ray security device of this disclosure, the lead curtain is hung on a top of the opening. A bottom edge of the lead curtain is adjacent to the conveyor without contacting.

According to the X-ray security device of this disclosure, the main body has a pair of openings and a pair of lead curtains correspondingly arranged thereon, the conveyor penetrates the main body through the pair of openings, and the openings are covered by the lead curtains respectively.

According to the X-ray security device of this disclosure, an overall width of the central module is one to two times greater than an overall width of each outer module.

According to the X-ray security device of this disclosure, the lead equivalent thickness of each outer module and the lead equivalent thickness of the central module are positively related to an occupancy factor.

According to the X-ray security device of this disclosure, the central module further has a central seat for fastening the central module on a top of the main body. The central seat has a plurality of fastening holes, and the fastening holes are elongated holes extended along the transport direction. Each outer module further has an outer seat for fastening the outer module on a top of the main body, the outer seat has a plurality of fastening holes, and the fastening holes are elongated holes extended perpendicular to the transport direction.

According to the X-ray security device of this disclosure, the lead curtain has outer modules and a central module, a lead equivalent thicknesses of each outer module is larger than that of the central module. Therefore, the X-ray in the main body may be effectively blocked so as to avoid the X-ray from radiating to areas at two side of the opening occupied by operators. A weight of the central module is less than that of each outer module so as to ensure that the lead curtain may be pushed away by the objects transferred into the main body.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
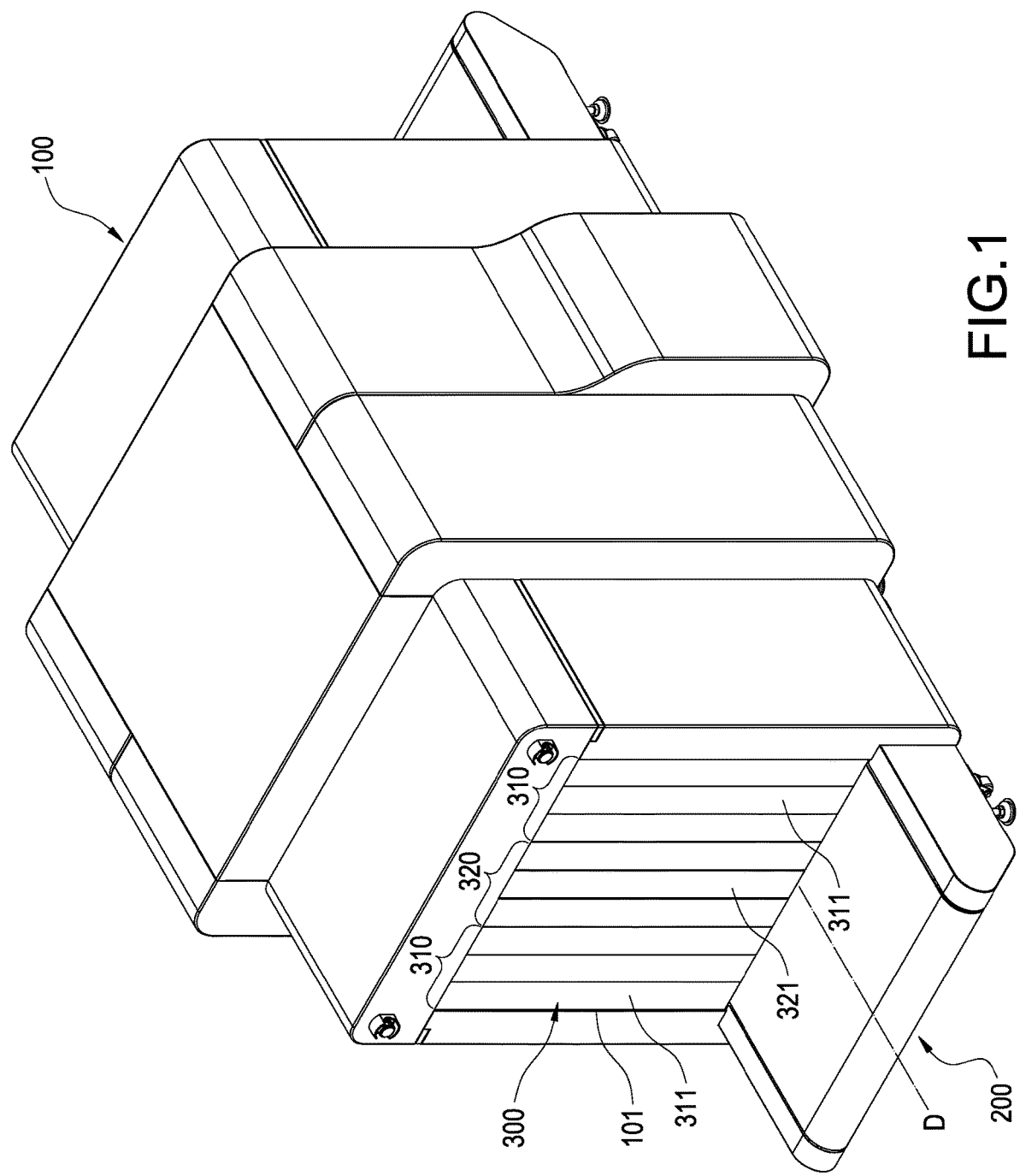
FIGS. 1 and 2 are perspective views showing an X-ray security device according to an embodiment of this disclosure.
Figure 2:
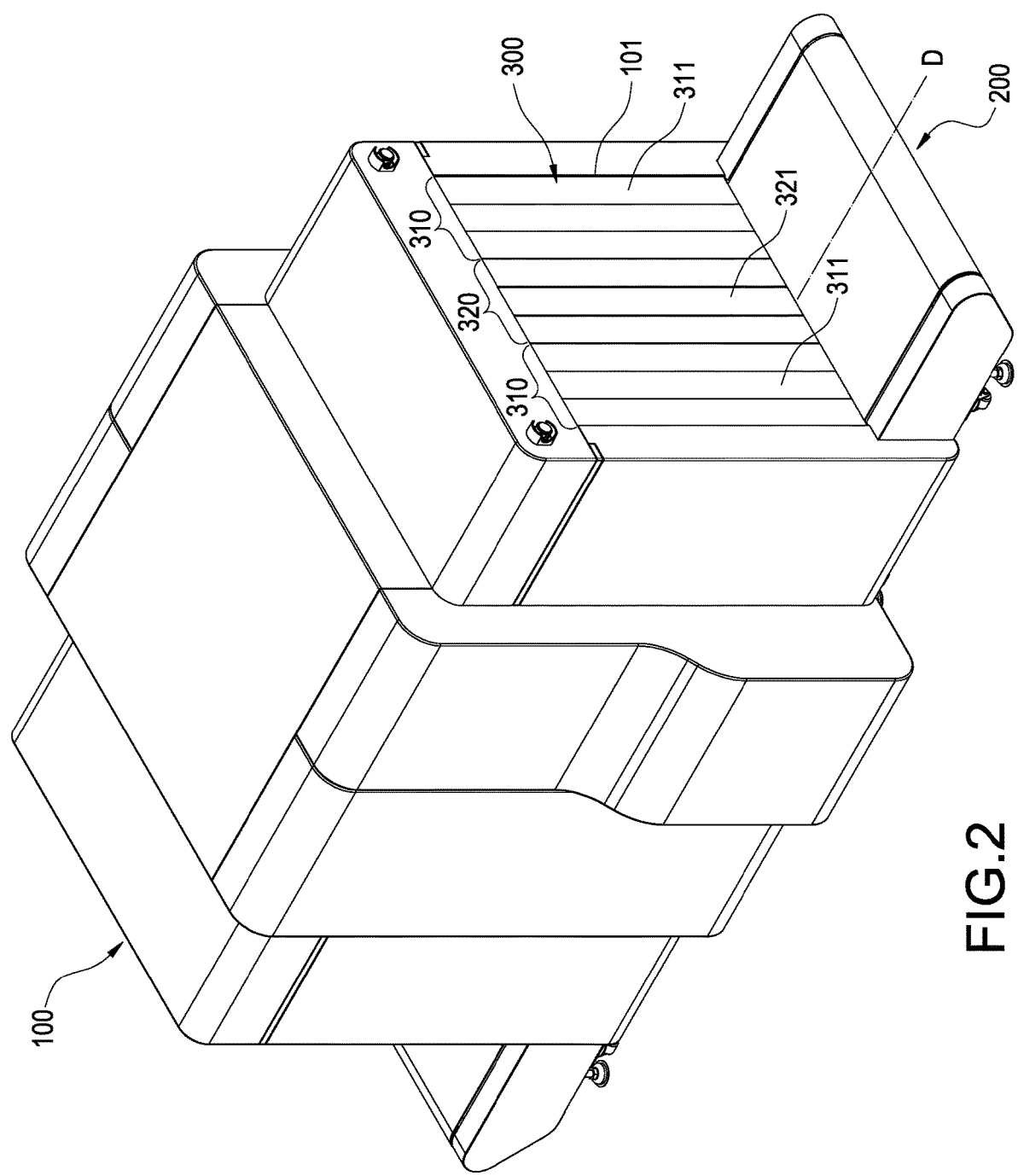
Figure 3:
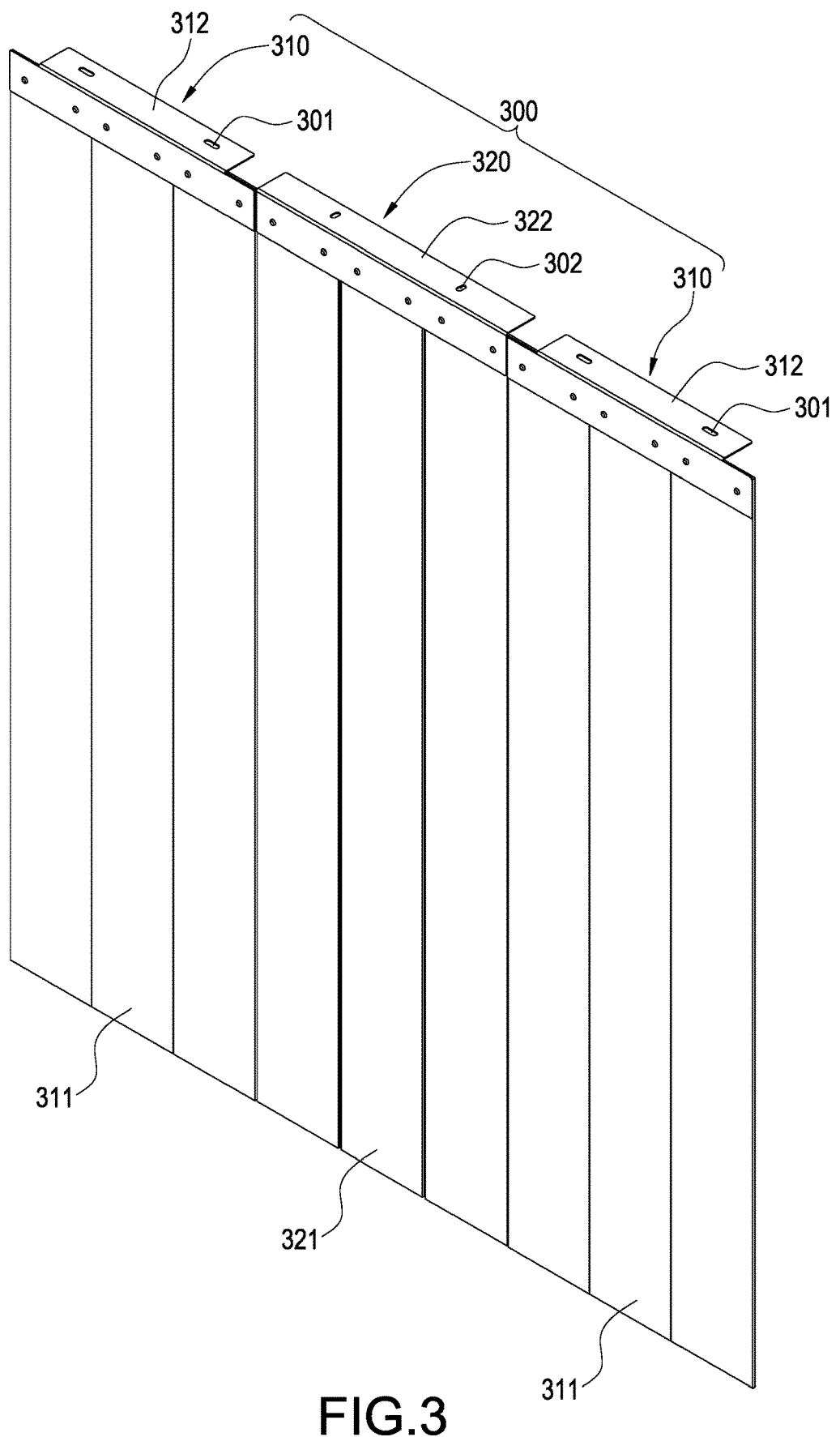
FIG. 3 is a perspective view showing a lead curtain of the X-ray security device according to the embodiment of this disclosure.
Figure 4:
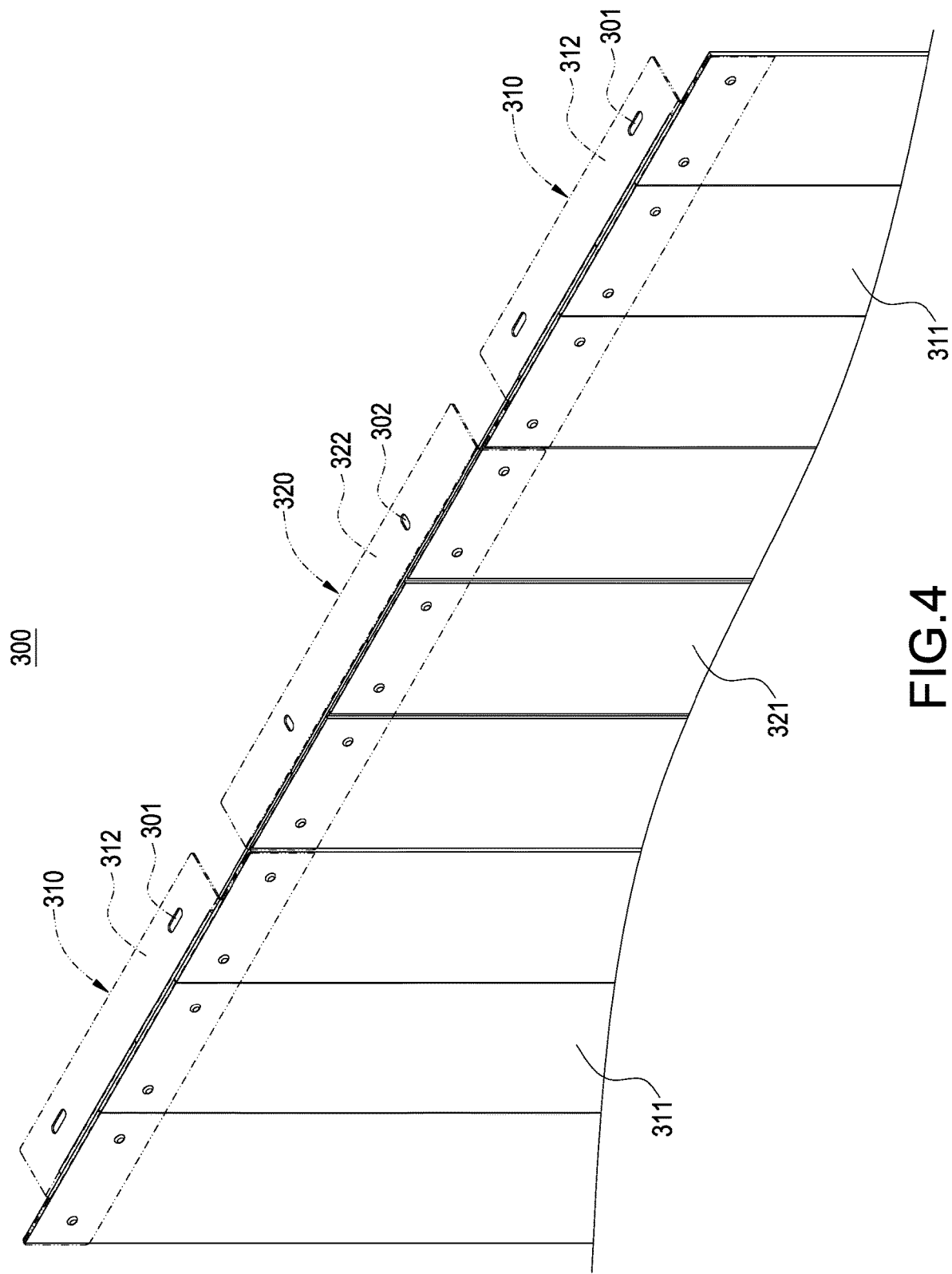
FIG. 4 is a partially enlarged view of FIG. 3.
Figure 5:
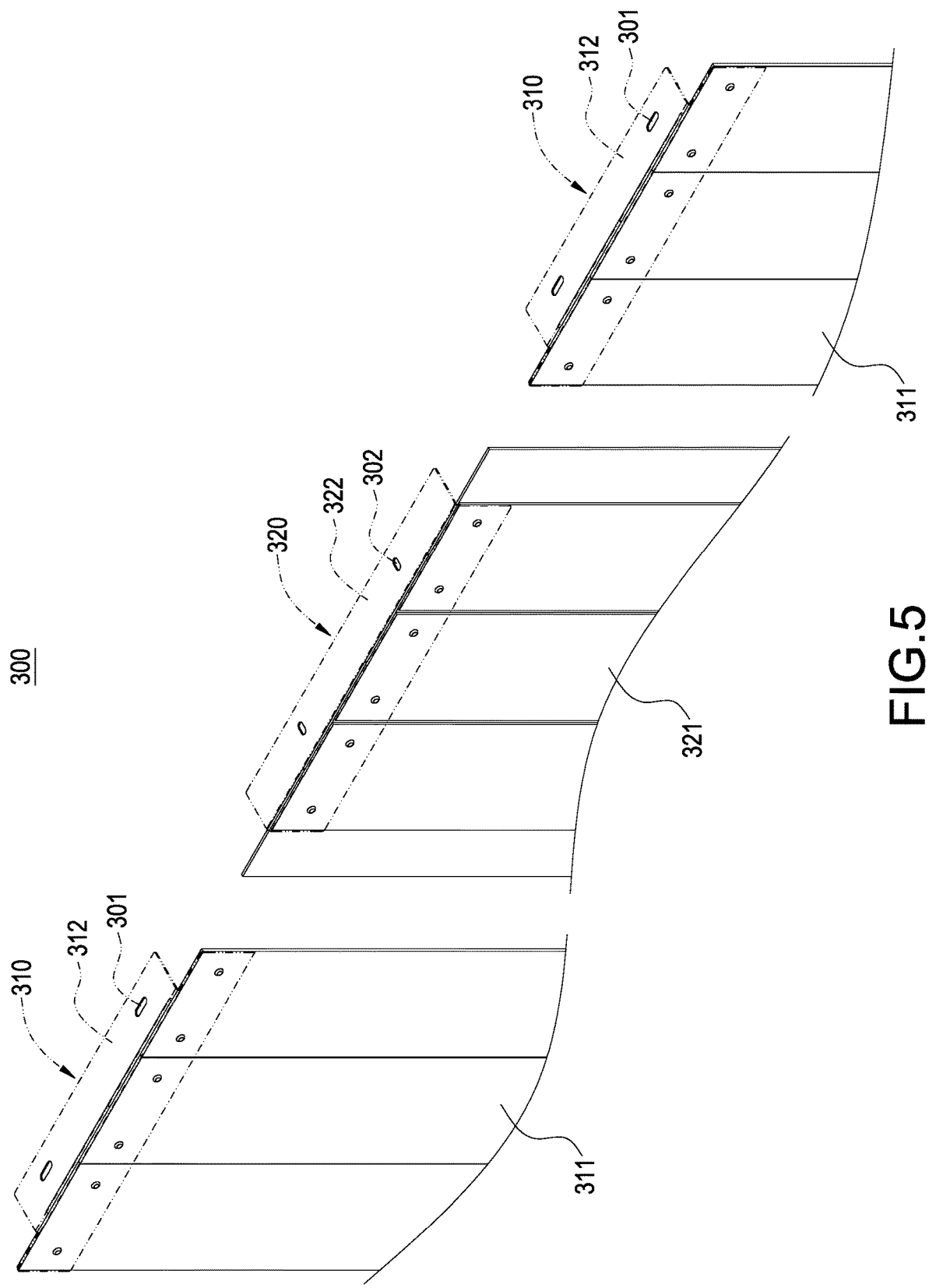
FIG. 5 is an exploded view showing the lead curtain of the X-ray security device according to the embodiment of this disclosure.

According to FIGS. 1 and 2, an X-ray security device is provided, the X-ray security device has a main body 100, a conveyor 200 and at least one lead curtain 300.

According to this embodiment, the main body 100 may be a metal housing, at least one opening 101 is defined on a lateral surface of the main body 100. According to this embodiment, the main body 100 has a tunnel and two openings 101 as an entrance and an exit of the tunnel, and the two openings 101 are respectively disposed on two sides of the main body 100 opposite to each other. Here is not intended to be limiting. The main body 100 is provided with an X-ray source for emitting X-rays into the main body 100.

The conveyor 200 passes through the opening 101 and is disposed on a bottom of the opening 101. In this embodiment, the conveyor 200 penetrates the main body 100 through the pair of openings 101. The conveyor 200 is used for inputting objects into the main body 100 to be scanned via X-ray.

Each lead curtains 300 is hung on the main body 100 so as to cover the opening 101. In this embodiment, a pair of lead curtains 300 corresponding to the two openings 101 are hung on the main body 100, and each lead curtain 300 covers each opening 101 respectively. In this embodiment, the lead curtain 300 is hung on a top of the opening 101, and a bottom edge of the lead curtain 300 is adjacent to the conveyor 200 without contacting the conveyor 200. However, in this disclosure, the positions for hanging the lead curtains 300 are not limited to the embodiment.

The two lead curtains 300 have the same structures and the same function. Only one of the lead curtains 300 is described as an example in following paragraphs. According to FIGS. 3 to 7, the lead curtain 300 has a pair of outer modules 310 and a central module 320, the pair of outer modules 310 are disposed at two sides of a transport direction D of the conveyor 200, the central module 320 is disposed between the pair of outer modules 310, and the central module 320 is disposed at a center of the opening 101. That is, the outer modules 310 and the central module 320 are arranged side by side to cover each opening 101. A lead equivalent thickness of each outer module 310 is larger than a lead equivalent thickness of the central module 320. Lead may effectively absorb radiation, and it is therefore a material widely used for radiation protection. When a protectivity of another protective material is considered, it is often shown in a comparison of lead equivalent. A lead equivalent thickness of an object refers to a thickness of a lead plate having the same radiation absorbing capacity with the object.

It is worth noting that the lead equivalent thicknesses of the outer modules 310 and the central module 320 are positively related to an occupancy factor (T). The occupancy factor (T) is a probability that an operator stays in an area, the occupancy factor $T_1$ at two sides of the opening 101 is higher than the occupancy factor $T_2$ at the center of the opening 101, and $T_1$ may be 2 times to 16 times greater than $T_2$. Lead equivalent thickness corresponding to various occupancy factors (T) is derived via a scattering shielding formula, and therefore the lead equivalent thickness of each outer module 310 is larger than the lead equivalent thickness of the central module 320.

In this embodiment, each outer module 310 has a plurality of outer curtain strips 311, and the central module 320 has a plurality of central curtain strips 321. A lead equivalent thickness of each outer curtain strip 311 is larger than a lead equivalent thickness of each central curtain strip 321. The lead equivalent thickness of each outer curtain strip 311 may be 2 times greater than the lead equivalent thickness of each central curtain strip 321. Specifically, the lead equivalent thickness of the outer curtain strip 311 is about 1.0 mm Pb, and the lead equivalent thickness of the central curtain strip 321 is about 0.5 mm Pb. In this embodiment, the outer curtain strip 311 and the central curtain strip 321 are made of the same lead rubber for a convenience of manufacturing. Therefore, a thickness of each outer module 310 is larger than a thickness of the central module 320, and a weight of the central module 320 is less than that of each outer module 310. In fact, the thickness t1 of the outer curtain strip 311 is approximately in a range from about 3.0 mm to about 3.5 mm the thickness t2 of the central curtain strip 321 is approximately in a range from about 2.0 mm to about 2.5 mm.

In this embodiment, an end of each of the plurality of the central curtain strips 321 is fixed on a central seat 322. The plurality of the central curtain strips 321 are stacked in two layers and arranged staggeredly to cover the gaps between two adjacent central curtain strips 321 to block the X-ray leakage from the main body 100. The central seat 322 may be an elongated metal piece, a plurality of fastening holes 302 are defined on the central seat 322 for fastening the central seat 322 to a top of the main body 100, and each fastening hole 302 of the central seat 322 is an elongated hole extended along a longitudinal direction of the central seat 322. In other words, each fastening hole 302 is an elongated hole extended along the transport direction D for shifting the central module 320 inward or outward along an opening direction of the opening 101, so as to eliminate assembly tolerances between the central module 320 and the outer modules 310.

In this embodiment, an end of each outer curtain strip 311 is fixed on an outer seat 312. The plurality of outer curtain strips 311 are stacked in two layers and arranged staggeredly so as to cover the gaps between two adjacent outer curtain strips 311 to block the X-ray leaking from the main body 100. The outer seat 312 may be an elongated metal piece, a plurality of fastening holes 301 are defined on the outer seat 312 for fastening the outer seat 312 to the top of the main body 100, and each fastening hole 301 of the outer seat 312 is an elongated hole extended along a lateral direction of the outer seat 312. In other words, each fastening hole 301 is extended along a direction perpendicular to the transport direction D for shifting the outer modules 310 along a lateral direction of the opening 101 corresponding side edges of the opening 101 and a position of the central module 320 so as to eliminate assembly tolerances.

Figure 6:
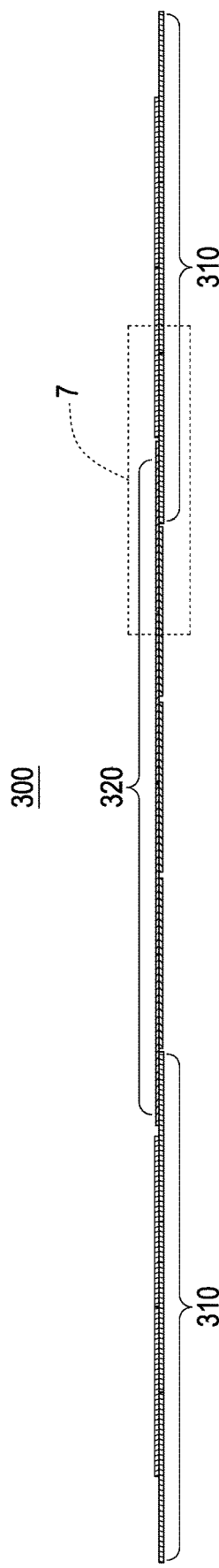
FIG. 6 is a laterally cross-sectional view of the lead curtain of the X-ray security device according to the embodiment of this disclosure.
Figure 7:
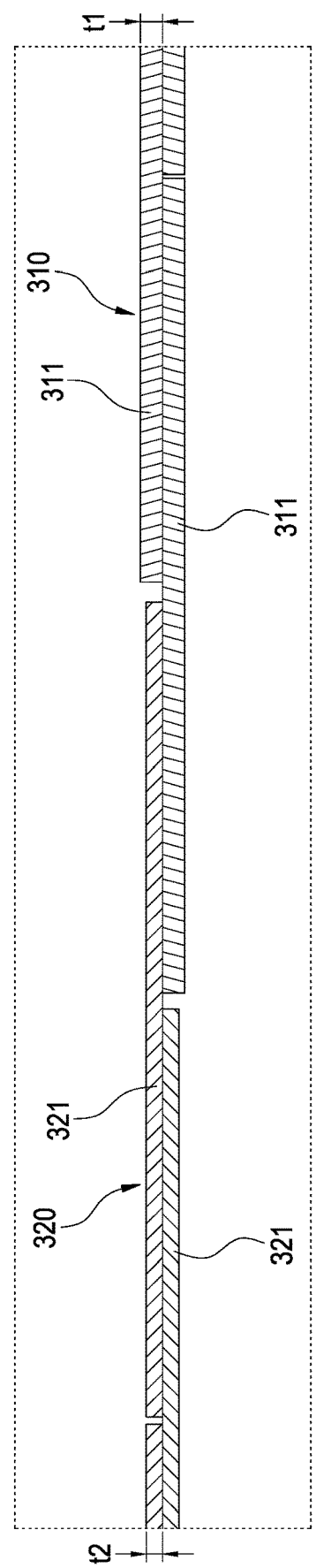
FIG. 7 is an enlarged view showing an area marked seven in FIG. 6.

In this embodiment shown in FIGS. 6 and 7, the outer curtain strip 311 and the central curtain strip 321 disposed at each junction between the central module 320 and the outer modules 310 are overlapped with each other and arranged staggeredly, the central module 320 may be adjusted along the transport direction D with respect to the extended direction of the fastening hole 302, and the central curtain strips 321 may be shifted for tightly overlapping with the outer curtain strips 311 so as to cover each junction between the central module 320 and each outer module 310 to block the X-ray leakage from the main body 100.

According to this disclosure, the lead curtain 300 of the X-ray security device has the outer modules 310 and the central module 320, and the lead equivalent thickness of each outer module 310 is larger than the lead equivalent thickness of the central module 320. Therefore, the X-ray in the main body 100 may be effectively prevented from the leakage to areas occupied by operators at two sides of the opening 101. In this embodiment, the central module 320 is a region where the objects mainly contact when passing the lead curtain 300, an overall width of the central module 320 is one to two times greater than an overall width of each outer module 310, and a weight of the central module 320 is less than that of each outer module 310 so as to ensure that the lead curtain 300 may be pushed away by the objects transferred into the tunnel of the main body 100.

While this disclosure has been described by means of specific embodiments, numerous modifications and variations could be made thereto by those skilled in the art without departing from the scope and spirit of this disclosure set forth in the claims.

What is claimed is:

1. An X-ray security device, comprising:
a main body, having an opening;
a conveyor, passing through the opening and disposed at a bottom of the opening; and
a lead curtain, hung on the main body and covering the opening, including a pair of outer modules and a central module, the pair of outer modules arranged corresponding to two sides of a transport direction of the conveyor, and the central module disposed between the outer modules;
wherein a lead equivalent thickness of each outer module is larger than a lead equivalent thickness of the central module, and a weight of the central module is less than a weight of each outer module.

2. The X-ray security device according to claim 1, wherein a thickness of each outer module is larger than a thickness of the central module.

3. The X-ray security device according to claim 2, wherein each outer module includes a plurality of outer curtain strips, the central module includes a plurality of central curtain strips, a thickness of each outer curtain strip is between about 3.0 mm to about 3.5 mm, and a thickness of each central curtain strip is between about 2.0 mm to about 2.5 mm.

4. The X-ray security device according to claim 1, wherein each outer module includes a plurality of outer curtain strips, the central module includes a plurality of central curtain strips, and a lead equivalent thickness of each outer curtain strip is double of a lead equivalent thickness of each central curtain strip.

5. The X-ray security device according to claim 4, wherein the lead equivalent thickness of each outer curtain strip is about 1.0 mm Pb, and the lead equivalent thickness of each central curtain strip is about 0.5 mm Pb.

6. The X-ray security device according to claim 1, wherein each outer module includes a plurality of outer curtain strips, the outer curtain strips are stacked in two layers and arranged staggeredly.

7. The X-ray security device according to claim 1, wherein the central module includes a plurality of central curtain strips, the central curtain strips are stacked in two layers and arranged staggeredly.

8. The X-ray security device according to claim 1, wherein each outer module includes a plurality of outer curtain strips, the central module comprises a plurality of central curtain strips, the outer curtain strip and the central curtain strip disposed at each junction between the central module and the outer modules are overlapped and arranged staggeredly.

9. The X-ray security device according to claim 1, wherein the lead curtain is hung on a top of the opening.

10. The X-ray security device according to claim 1, wherein a bottom edge of the lead curtain is adjacent to the conveyor without contact.

11. The X-ray security device according to claim 1, wherein the main body includes a pair of openings and a pair of lead curtains correspondingly arranged thereon, the conveyor penetrates the main body through the pair of openings, and the openings are covered by the lead curtains respectively.

12. The X-ray security device according to claim 1, wherein an overall width of the central module is one to two times greater than an overall width of each outer module.

13. The X-ray security device according to claim 1, wherein the lead equivalent thickness of each outer module and the lead equivalent thickness of the central module are positively related to an occupancy factor.

14. The X-ray security device according to claim 1, wherein the central module further includes a central seat configured to fasten the central module on a top of the main body, the central seat has a plurality of fastening holes, and the fastening holes are elongated holes extended along the transport direction.

15. The X-ray security device according to claim 1, wherein each outer module further includes an outer seat configured to fasten the outer module on a top of the main body, the outer seat has a plurality of fastening holes, and the fastening holes are elongated holes extended perpendicular to the transport direction.

\* \* \* \* \*